(12) United States Patent
Piel et al.

(10) Patent No.: US 10,719,416 B2
(45) Date of Patent: Jul. 21, 2020

(54) METHOD AND DEVICE FOR RECOGNIZING HARDWARE ERRORS IN MICROPROCESSORS

(71) Applicant: Robert Bosch GmbH, Stuttgart (DE)

(72) Inventors: Gunnar Piel, Hemmingen (DE); Peter Munk, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 250 days.

(21) Appl. No.: 15/982,054

(22) Filed: May 17, 2018

(65) Prior Publication Data

US 2018/0336107 A1 Nov. 22, 2018

(30) Foreign Application Priority Data

May 19, 2017 (DE) .................. 10 2017 208 484

(51) Int. Cl.
*G06F 11/14* (2006.01)
*G06F 11/16* (2006.01)

(52) U.S. Cl.
CPC ........ *G06F 11/1497* (2013.01); *G06F 11/165* (2013.01); *G06F 11/1641* (2013.01); *G06F 11/1679* (2013.01)

(58) Field of Classification Search
CPC ............. G06F 11/1641; G06F 11/1679; G06F 11/1497
See application file for complete search history.

(56) References Cited

U.S. PATENT DOCUMENTS 4,805,107 A * 2/1989 Kieckhafer ........... G06F 9/4881
714/15
5,790,397 A * 8/1998 Bissett .................... G06F 11/07
700/2
(Continued)

FOREIGN PATENT DOCUMENTS

DE 102005037245 A1 2/2007

OTHER PUBLICATIONS

Yang, Chengmo; Orailoglu, Alex. A Light-weight Cache-based Fault Detection and Checkpointing Scheme for MPSoCs Enabling Relaxed Execution Synchronization. Oct. 2008. ACM.*

(Continued)

*Primary Examiner* — Paul Contino
(74) *Attorney, Agent, or Firm* — Norton Rose Fulbright US LLP; Gerard Messina

(57) ABSTRACT

A method/device for recognizing a microprocessor hardware error, including comparing a first application's first result, running on a first microprocessor, with a second application's second result, running on the first/second microprocessor, with a microcontroller, providing comparison strategies, the hardware error being recognized as a function of the comparison, the microcontroller receiving a first message from the first microprocessor, and receiving a second message from the first microprocessor if the second application runs on the first microprocessor, or receives a first message from the second microprocessor if the second application runs thereon, the first message containing first comparison strategy information and first result information of a first function calculation, the second message containing second comparison strategy information and second result information of a second function calculation, the first and second strategy information being compared, the first (Continued)

and second result information being compared if the information about the comparative strategy coincides.

13 Claims, 3 Drawing Sheets

(56) References Cited

U.S. PATENT DOCUMENTS

| | | | | |
|---|---|---|---|---|
| 8,549,389 | B2* | 10/2013 | Martin | G06F 11/1612 |
| | | | | 714/733 |
| 10,248,514 | B2* | 4/2019 | Hays | G06F 11/1487 |
| 10,409,666 | B2* | 9/2019 | Liisberg | G06F 11/0724 |
| 2012/0210162 | A1* | 8/2012 | Gara | G06F 11/1064 |
| | | | | 714/6.1 |
| 2015/0095699 | A1* | 4/2015 | Shirano | G06F 11/1641 |
| | | | | 714/12 |
| 2016/0055047 | A1* | 2/2016 | Okamoto | G06F 11/1687 |
| | | | | 714/57 |
| 2017/0074930 | A1* | 3/2017 | Nayyar | G06F 11/004 |
| 2017/0262330 | A1* | 9/2017 | Kopetz | G06F 11/0739 |
| 2019/0026198 | A1* | 1/2019 | Liisberg | G06F 11/165 |

OTHER PUBLICATIONS

Blough, et al.: "A Comparison of Voting Strategies for Fault-Tolerant Distributed Systems", Proceedings of Ninth Symposium on Reliable Distributed Systems, HUntsville, AL (1990), pp. 136-145.

Koepernik, et al.: "Functional Safety in the Development of Chassis and Driver Assistance Systems: Focus on System Architecture", Vector Congress (2008), pp. 1-15.

* cited by examiner

METHOD AND DEVICE FOR RECOGNIZING HARDWARE ERRORS IN MICROPROCESSORS

RELATED APPLICATION INFORMATION

The present application claims priority to and the benefit of German patent application no. 10 2017 208 484.7, which was filed in Germany on May 19, 2017, the disclosure which is incorporated herein by reference.

FIELD OF THE INVENTION

The present invention relates to a method and device for recognizing hardware errors in microprocessors, in particular, by comparing results of safety-relevant applications.

BACKGROUND INFORMATION

Patent document DE102005037245 A1 discusses a method for recognizing random hardware errors in microprocessors with the aid of a lockstep configuration.

In contrast, it is believed to be desirable to provide an improved method and an improved device for arbitrary safety-critical applications.

SUMMARY OF THE INVENTION

This object may be achieved by the method and the device as described herein.

To compare a first result of a first application, which runs on a first microprocessor, with a second result of a second application, which runs on the first microprocessor or on a second microprocessor, with the aid of a microcontroller, which provides various comparison strategies, a hardware error being recognized as a function of the result of the comparison, the microcontroller receives a first message from the first microprocessor, the microcontroller receiving a second message from the first microprocessor if the second application runs on the first microprocessor, or receives a first message from the second microprocessor if the second application runs on the second microprocessor, the first message containing information about a first comparison strategy and information about a first result of a first calculation of a function by the first application, the second message containing information about a second comparison strategy and information about a second result of a second calculation of the function by the second application, the information about the first comparison strategy being compared with the information about the second comparison strategy, the information about the first result being compared with the information about the second result if the information about the first comparative strategy coincides with the information about the second comparison strategy. The comparison strategies are predefinable in an application-specific manner. This allows for high flexibility.

Information about a corrected result is advantageously determined if, when the first comparison strategy coincides with the second comparison strategy, the information about the first result differs from the information about the second result, or the hardware error is recognized if, when the first comparison strategy coincides with the second comparison strategy, the information about the first result differs from the information about the second result. In this way, the microcontroller is able to handle slightly different results or is able to identify the hardware error as a function of differences of the results. The hardware error is advantageously recognized when the first comparison strategy does not coincide with the second comparison strategy. If the comparison strategies do not coincide, the hardware error is recognized.

Information about a first comparison parameter is advantageously contained in the first message, information about a second comparison parameter being contained in the second message, the information about the first comparison parameter being compared with the information about the second comparison parameter and, if the information about the first comparison parameter coincides with the information about the second comparison parameter, the information about the first result being compared with the information about the second result as a function of the first comparison parameter or of the second comparison parameter, an error being recognized when the first comparison parameter does not coincide with the second comparison parameter. Comparison parameters enable an application-specific parameterization of the comparison strategies.

The information about the first comparison parameter is advantageously compared with the information about the second comparison parameter with the aid of a binary comparison. This is very rapidly and reliably possible.

The information about the first comparison strategy is advantageously compared with the information about the second comparison strategy with the aid of a binary comparison. This is also very rapid and reliable.

In addition to the information about the first result, the first message advantageously contains information about the first input data, which is to be used by the first application for the first calculation and, in addition to the information about the second result, the second message contains information about second input data, which are to be used by the second application for the second calculation, the information about the first input data being compared with the information about the second input data, the first calculation being stopped before the start of the first calculation and/or the second calculation being stopped before the start of the second calculation if the information about the first input data does not coincide with the information about the second input data. As a result, the calculation is not started when an error is recognized.

In addition to information about the first result, the first message advantageously contains information about first input data, which are used by the first application for the first calculation of the first result, whereas the information about the first result is compared with the information about the second result and, in addition to information about the second result, the second message contains information about second input data, which are used by the second application for the second calculation, whereas the information about the first result is compared with the information about the second result, the information about the first input data being compared with the information about the second input data, the first calculation being discontinued and/or the second calculation being discontinued if the information about the first input data does not coincide with the information about the second input data. As a result, the calculation is discontinued when an error is recognized.

The information about the first result is advantageously a first value of the first result, and the information about the second result is a second value of the second result. The result is checked before it is used.

The information about the first result is advantageously a first signature of a first value of the first result, and the information about the second result is a second signature of a second value of the second result. The result is potentially a very large value. In contrast, the signature is a small value, which may be more easily transmitted in messages and evaluated.

If the first signature coincides with the second signature, the information about the first result is advantageously selectively transmitted from the first application to a receiver or the information about the second result is transmitted by the second application to a receiver. In this way, the result arrives at a receiver directly via the microcontroller.

Thus, the present application describes a method and device for recognizing a hardware error in a microprocessor, including a comparison of a first result of a first application, which runs on a first microprocessor (106), with a second result of a second application, which runs on the first microprocessor (106) or on a second microprocessor (110), with the aid of a microcontroller (102), which provides various comparison strategies, the hardware error being recognized as a function of the result of the comparison, the microcontroller (102) receiving a first message (104) from the first microprocessor (106), the microcontroller (102) receiving a second message (108) from the first microprocessor (106) if the second application runs on the first microprocessor (106), or receiving a first message (104) from the second microprocessor (110) if the second application runs on the second microprocessor (110), the first message (104) containing information about a first comparison strategy and information about a first result of a first calculation of a function by the first application, the second message (108) containing information about a second comparison strategy and information about a second result of a second calculation of the function by the second application, the information about the first comparison strategy being compared with the information about the second comparison strategy, the information about the first result being compared with the information about the second result if the information about the comparative strategy coincides.

Additional advantageous embodiments result from the following description and from the drawings.

DETAILED DESCRIPTION

Figure 1:
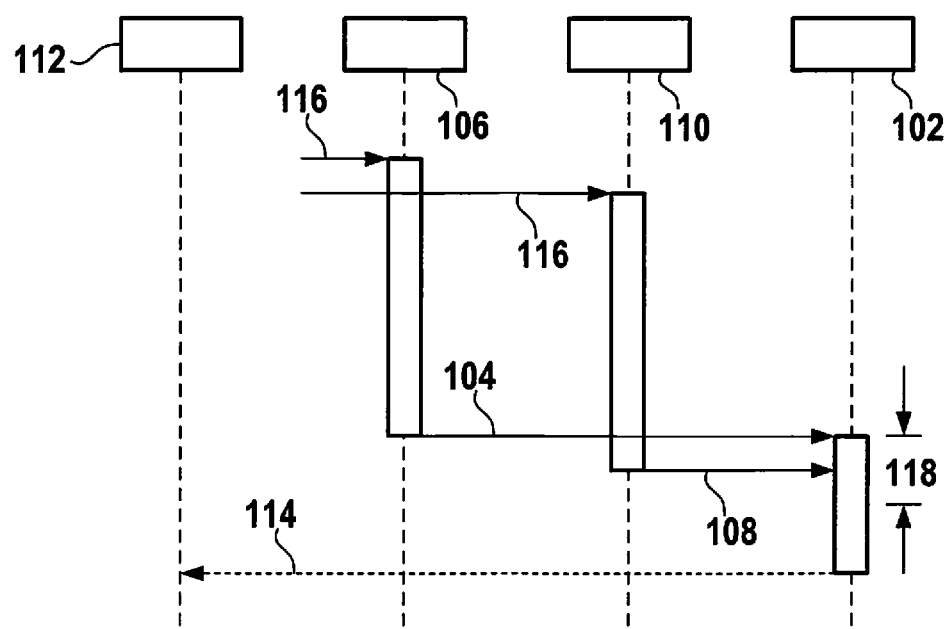
FIG. 1 schematically shows tasks in a first method for comparing results of safety-relevant applications.

A first method for recognizing hardware errors by comparing results of arbitrary safety-relevant applications with the aid of an application-agnostic and configurable microcontroller 102 is described below with reference to FIG. 1. Microcontroller 102 provides various comparison strategies. FIG. 1 schematically shows in a first sequence diagram steps in the first method for comparing results of safety-relevant applications.

Due to increasing demands on the computing capacity of applications, such as the highly automated or autonomous driving, and due to lower unit costs, microprocessors are also increasingly used in safety-critical products, which no longer provide a lockstep configuration in hardware. For this reason, a lockstep method is reproduced in software. In such case an application is copied and implemented in parallel on two or more processor cores or processors. The results of the calculation of safety-relevant functions by various copies of the application are compared on a reliable microcontroller. This microcontroller is configured to implement a lockstep function in hardware. Should one of the microprocessors exhibit an error, and the subsequently implemented application consequently produces an erroneous result, then this is recognized by microcontroller 102. In the case of three or more microprocessors, the erroneous copy of the application is to be identified as trivial for a simple error, in the case of two microprocessors, microcontroller 102 may start a diagnostic routine. This is described below by way of example of two copies of one application. Each of the copies is configured to calculate the same result with the same function from the same input data.

Microcontroller 102 receives a first message 104 from a first application, which runs on a first microprocessor 106, and a second message 108 from a second application, which runs on a second microprocessor 110. The first application is a first copy of the application and is referred to below as first application copy. The second application is a second copy of the application and is referred to below as second application copy. The second application copy may also run on first microprocessor 106. First message 104 and second message 108 have the following structure:

$$N=\{E,VS,W,Y\}$$

where
E result
VS comparison strategy and/or parameter
W maximum waiting time on the results of other application copies,
Y receiver of the result.

Microcontroller 102 compares the first comparison strategy contained in first message 104 with a second comparison strategy, which is contained in second message 108, a hardware error being recognized as a function of the result of the comparison. The hardware error is recognized, for example, if comparison strategies, when compared, differ from one another.

If first message 104 or second message 108 also contains comparison parameters, these are also compared. This may take place in a binary manner.

If the comparison strategies coincide, microcontroller 102 uses the first or second comparison strategy, in order to compare a first result, which is contained in first message 104, with a second result, which is contained in second message 108. Otherwise an error is recognized. The hardware error is recognized, for example, if results, when compared, differ from one another.

The result of the comparison is one of the states:
F error recognized by the microcontroller
zE reliable result calculated by the microcontroller.

After the comparison, a receiver 112 then receives a third message 114 from microcontroller 102 if a reliable result zE is present. The reliable result is conveyed in third message 114.

Because the comparison strategy is conveyed by application copies 106, 110, the applications have a choice with regard to the comparison strategy.

Message N={E, VS, W, Y} is sent to microcontroller 102, for example, via middleware. Since the middleware calls up the application in an event-driven manner, microcontroller 102 must also be started in an event-driven manner. This may be achieved, for example, via an interrupt on microcontroller 102. If microcontroller 102 receives first message 104 of the first application copy from first microprocessor 106, it then initially waits for the second message of the second application copy from second microprocessor 110. If after the arrival time of first message 104, second message 108 does not reach microcontroller 102 within maximum waiting time 118, a timeout error for second application 110 is then recognized. Microcontroller 102 may respond accordingly in this case, for example, by reporting the timeout error to a diagnostic unit, which attempts to repair second application 110 with a restart. Error F recognized by microcontroller 102 is conveyed, for example. In the example of FIG. 1, second message 108 arrives after first message 104 before the expiration of maximum waiting time 118.

If more than two applications are provided, microcontroller 102 may wait until all or enough, for example, 2 of 3, messages N have arrived.

Microcontroller 102 then initially compares the comparison strategies and the associated parameters of all messages that have arrived. A binary comparison is sufficient for such purpose. If a message contains a comparison strategy different from that of the other messages, the corresponding application is then also recognized and reported as erroneous.

Similarly, microcontroller 102 compares all receivers Y from messages N. If a message N contains a receiver different from that of the other messages N, the corresponding application is then recognized and reported as erroneous.

Microcontroller 102 subsequently uses the coinciding comparison strategy, in order to compare the results E of all messages N or of all applications. In the process, erroneous applications are recognized and reported depending on the strategy, or a new reliable result is generated. The erroneous applications are recognized, for example, by binary comparison or ε-comparison. The new, reliable result is determined, for example, by a median calculation across all results. Error F recognized by microcontroller 102 or reliable result zE calculated by microcontroller 102 is then conveyed.

Finally, in the case of coinciding comparison strategy and coinciding information about result E, microcontroller 102 sends result E to actual receiver 112. This takes place, for example, also via the middleware.

For this purpose, the middleware calls up the first application copy on first microprocessor 106 and delivers input data 116. On a second microprocessor 110, the middleware calls up the second application copy and delivers input data 116. Alternatively, an additional unit may be called up, which replicates and forwards input data 116. After the calculation, the first application copy sends first message 104 and the second application copy sends second message 108 to microcontroller 102. Microcontroller 102 awaits second message 108 from the second application copy within maximum waiting time 118. After the comparison, microcontroller 102 sends result E to actual receiver 112.

Figure 2:
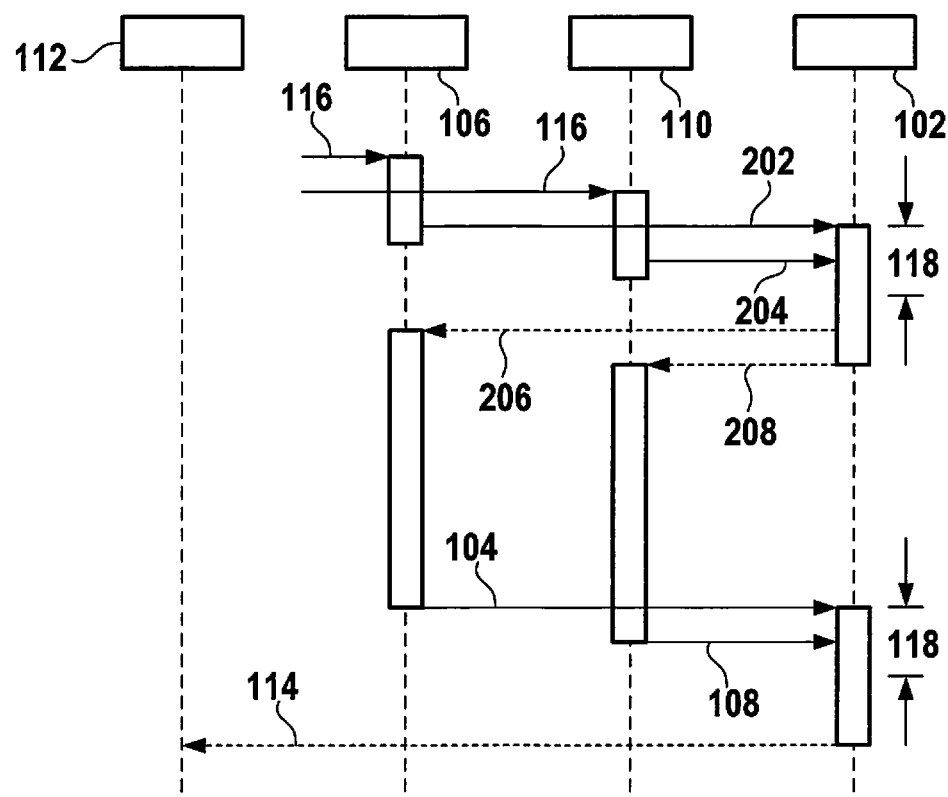
FIG. 2 schematically shows tasks in a second method for comparing results of safety-relevant applications.

FIG. 2 schematically shows in a second sequence diagram steps in a second method for comparing results of safety-relevant applications. In this case, the input data of the applications, in addition to the results, are also checked.

For this purpose, the first application copy sends its input data 116, together with a first comparison strategy and, if available, its associated first comparison parameter, as well as maximum waiting time 118 as fourth message 202 to microcontroller 102. The second application copy sends its input data 116, together with a second comparison strategy and, if available, its associated second comparison parameter, as well as maximum waiting time 118 as fifth message 204 to microcontroller 102.

Microcontroller 102 checks whether input data 116 coincide and, if there is coincidence subsequently starts the implementation of the first application copy via a sixth message 206 to the first application copy and, starts the implementation of the second application copy via a seventh message 208 to the second application copy. The further course corresponds to the sequence described previously for FIG. 1. If coincidence is lacking, an error F is recognized, for example.

This has the advantage that erroneous input values 116, which would produce different results, are recognized early. This prevents stateful systems from having to carry out a rollback in the event of an erroneous application copy, i.e., to load an old but correct system state.

Figure 3:
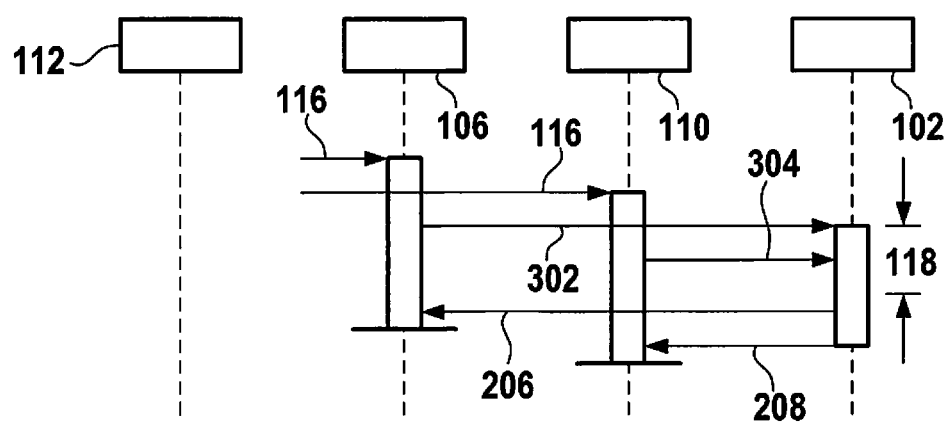
FIG. 3 schematically shows tasks in a third method for comparing results of safety-relevant applications.

FIG. 3 schematically shows in a third sequence diagram steps in a third method for comparing results of safety-relevant applications, in which the implementation of the application copies is started already in parallel to the comparison of input data 116. In this case, the implementation of microcontroller 102 is discontinued if different input data 116 are recognized. The receiver receives no result, i.e., third message 114 is omitted.

This has the advantage that the implementation of the actual application in the error-free case, i.e., in the majority of implementations, is not delayed.

In this case, an eighth message 302 conveys the content of first message 201 and of fourth message 202 and replaces these. A ninth message 304 conveys the content of second message 202 and of fifth message 203 and replaces these. If an error is recognized, the implementation of the first application copy as described above is discontinued via sixth message 206 to the first application copy. If an error is recognized, the implementation of the second application copy as described above is discontinued via seventh message 208 to the second application copy. The receiver receives no result, i.e., third message 114 is omitted.

Figure 4:
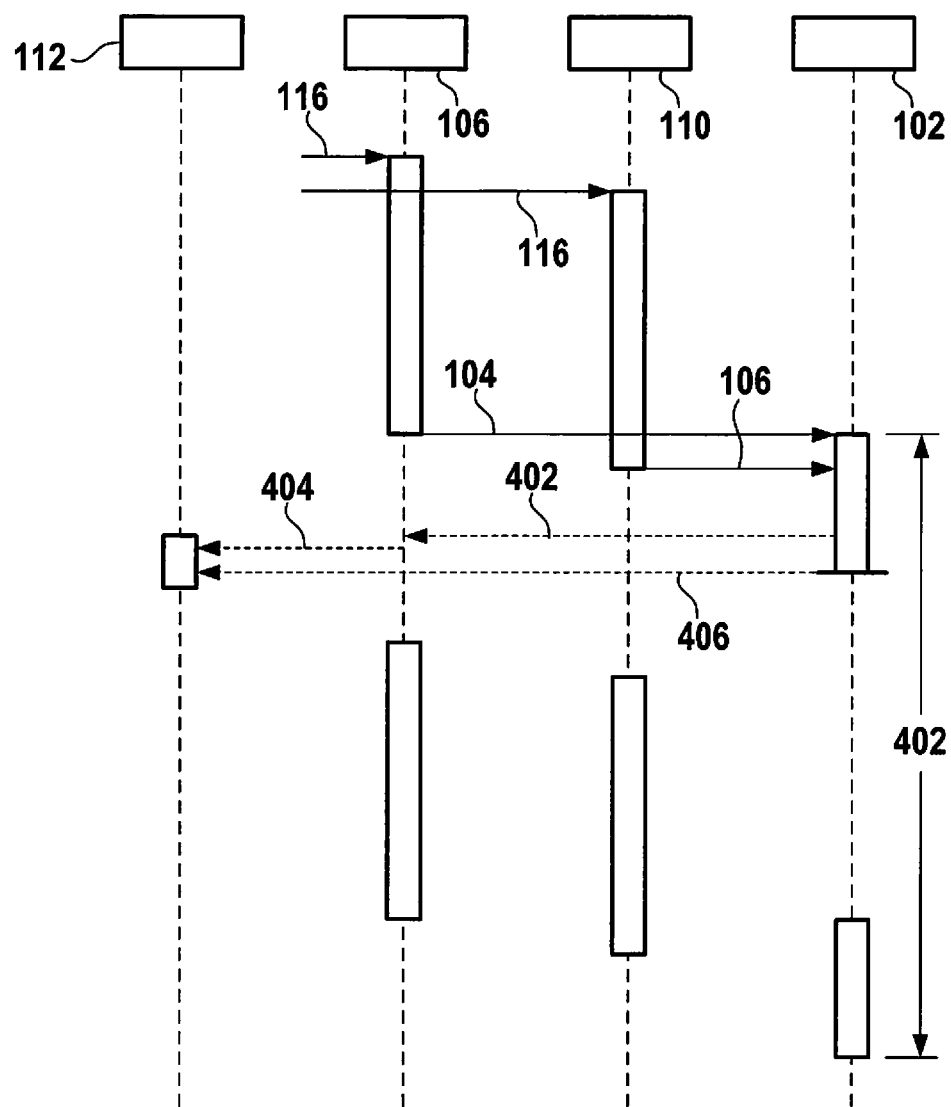
FIG. 4 schematically shows tasks in a fourth method for comparing results of safety-relevant applications.

FIG. 4 schematically shows in a fourth sequence diagram steps in a fourth method for comparing results of safety-relevant applications in a periodic, i.e., non-event-based system.

Instead of maximum waiting time 118, both application copies in the periodic case send a maximum time period 402 until the next output of a result to microcontroller 102. In contrast to the event-based system, the microcontroller may then also recognize an error, in which all application copies send no message.

Instead of sending actual result E to microcontroller 102, a signature S of the actual value of result E may also be transmitted in order to save band width for large results, for example, image data or trajectories.

Signatures S are compared only in a binary manner, for example. If the aforementioned mechanisms are used for increasing the diversity, then comparison strategies such as the ε-comparator or correction strategies such as the median may generally not be used due to the compression of prevalent signature mechanisms. Hence, this alternative is not applicable in this case.

If, however, signature S may be compared in a binary manner, the actual receiver must then still receive the actual result. Hence, after the comparison of an arbitrary application copy that calculated a correct result E, microcontroller 102 permits this application copy to send its result E to actual receiver 112. For this purpose, microcontroller 102 sends a tenth message 402, OK, to the first application copy, for example. The first application copy sends result E to receiver 112 via an eleventh message 404.

Receiver 112 further optionally receives a twelfth message 406 from microcontroller 102, in which signature S of correct result E is transmitted. This makes it possible for receiver 112, after receiving result E through recalculation of signature S' and after a binary comparison with signature S received from microcontroller 102, to check whether result E has been changed in the interim.

What is claimed is:

1. A method for recognizing a hardware error in a microprocessor, the method comprising:
   comparing a first result of a first application, which runs on a first microprocessor, with a second result of a second application, which runs on the first microprocessor or on a second microprocessor, with a microcontroller, which provides comparison strategies, the hardware error being recognized as a function of the result of the comparison;
   receiving at the microcontroller a first message from the first microprocessor;
   receiving at the microcontroller a second message from the first microprocessor if the second application runs on the first microprocessor, or receiving a first message from the second microprocessor if the second application runs on the second microprocessor, wherein the first message contains information about a first comparison strategy and information about a first result of a first calculation of a function by the first application, the second message containing information about a second comparison strategy and information about a second result of a second calculation of the function by the second application;
   comparing the information about the first comparison strategy with the information about the second comparison strategy; and
   comparing the information about the first result with the information about the second result if the information about the first comparison strategy coincides with the information about the second comparison strategy.

2. The method of claim 1, wherein information about a corrected result is determined if, when the first comparison strategy coincides with the second comparison strategy, the information about the first result differs from the information about the second result, or the hardware error is recognized if, when the first comparison strategy coincides with the second comparison strategy, the information about the first result differs from the information about the second result.

3. The method of claim 1, wherein the hardware error is recognized when the first comparison strategy does not coincide with the second comparison strategy.

4. The method of claim 1, wherein information about a first comparison parameter is contained in a first message, information about a second comparison parameter being contained in a second message, the information about the first comparison parameter being compared with the information about the second comparison parameter and, if the information about the first comparison parameter coincides with the information about the second comparison parameter, the information about the first result being compared with the information about the second result as a function of the first comparison parameter or of the second comparison parameter, an error being recognized if the first comparison parameter does not coincide with the second comparison parameter.

5. The method of claim 4, wherein the information about the first comparison parameter is compared with the information about the second comparison parameter with a binary comparison.

6. The method of claim 1, wherein the information about the comparison strategy is compared with the information about the second comparison strategy with the aid of a binary comparison.

7. The method of claim 1, wherein, in addition to information about the first result, the first message contains information about first input data, which are to be used by the first application for the first calculation and, in addition to information about the second result, the second message contains information about second input data, which are to be used for the second calculation, the information about the first input data being compared with the information about the second input data, the first calculation being stopped before the start of the first calculation and/or the second calculation being stopped before the start of the second calculation if the information about the first input data does not coincide with the information about the second input data.

8. The method of claim 1, wherein, in addition to information about the first result, the first message contains information about first input data, which are used by the first application for the first calculation of the first result, whereas the information about the first result is compared with the information about the second result and, in addition to information about the second result, the second message contains information about second input data, which are used by the second application for the second calculation, whereas the information about the first result is compared with the information about the second result, the information about the first input data being compared with the information about the second input data, the first calculation being discontinued and/or the second calculation being discontinued if the information about the first input data does not coincide with the information about the second input data.

9. The method of claim 1, wherein the information about the first result is a first value of the first result, and the information about the second result is a second value of the second result.

10. The method of claim 1, wherein the information about the first result is a signature of a first value of the first result, and the information about the second result is a second signature of a second value of the second result.

11. The method of claim 10, wherein if the first signature coincides with the second signature, the information about the first result is selectively transmitted from the first application to a receiver, or the information about the second result is transmitted by the second application to a receiver.

12. A device for recognizing a hardware error in a microprocessor, comprising:
   a microcontroller configured to perform the following:
      comparing a first result of a first application, which runs on a first microprocessor, with a second result of a second application, which runs on the first microprocessor or on a second microprocessor, with the microcontroller, which provides comparison strategies, the hardware error being recognized as a function of the result of the comparison;
      receiving at the microcontroller a first message from the first microprocessor;
      receiving at the microcontroller a second message from the first microprocessor if the second application runs on the first microprocessor, or receiving a first message from the second microprocessor if the second application runs on the second microprocessor, wherein the first message contains information about a first comparison strategy and information about a first result of a first calculation of a function by the first application, the second message containing information about a second comparison strategy and information about a second result of a second calculation of the function by the second application;

comparing the information about the first comparison strategy with the information about the second comparison strategy; and comparing the information about the first result with the information about the second result if the information about the first comparison strategy coincides with the information about the second comparison strategy.

13. The device of claim 12, wherein the microcontroller is configured to carry out a lockstep function in hardware.

* * * * *